US010146258B2

(12) United States Patent
Sinha et al.

(10) Patent No.: US 10,146,258 B2
(45) Date of Patent: Dec. 4, 2018

(54) OPTICAL IMAGE SENSOR FOR DISPLAY INTEGRATION

(71) Applicant: Synaptics Incorporated, San Jose, CA (US)

(72) Inventors: Supriyo Sinha, San Jose, CA (US); Pascale El Kallassi, San Jose, CA (US); Paul Wickboldt, San Jose, CA (US); Bob Mackey, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 174 days.

(21) Appl. No.: 14/871,981

(22) Filed: Sep. 30, 2015

(65) Prior Publication Data

US 2017/0091506 A1  Mar. 30, 2017

(51) Int. Cl.
*G06K 9/00* (2006.01)
*G06F 1/16* (2006.01)
*G06K 9/20* (2006.01)

(52) U.S. Cl.
CPC ......... *G06F 1/1643* (2013.01); *G06K 9/0004* (2013.01); *G06K 9/00026* (2013.01); *G06K 9/209* (2013.01); *G06K 9/2018* (2013.01)

(58) Field of Classification Search
CPC .. G02B 6/0018; G02B 6/0028; G02B 6/0011; G02B 6/0031; G02B 6/0075;

(Continued)

(56) References Cited

U.S. PATENT DOCUMENTS 5,726,443 A * 3/1998 Immega ............... G01S 17/026
                                                       250/208.1
6,512,381 B2    1/2003 Kramer
(Continued)

FOREIGN PATENT DOCUMENTS

CN          103942537 A        7/2014
CN          104035620 A        9/2014
(Continued)

OTHER PUBLICATIONS

Goodix® Shenzhen GOODIX Technology Co., Ltd., Patent Proposal, Ultra thin optical fingerprint sensor, May 12, 2016.
(Continued)

*Primary Examiner* — Brian Werner
*Assistant Examiner* — Ian L Lemieux
(74) *Attorney, Agent, or Firm* — Leydig, Voit & Mayer, Ltd.

(57) ABSTRACT

An electronic device including an optical sensor for optically sensing an image of an input object such as a user's fingerprint is provided. The electronic device includes a display layer, a detector, a pinhole layer, a cover layer and an illuminator. The display layer is configured to generate light within a visible light spectrum. The detector is configured to be sensitive to a wavelength of light. The pinhole layer is located above both the display layer and the detector. The cover layer is located above the pinhole layer, and the illuminator is configured to illuminate a sensing region of the cover layer with the wavelength of light. Further, the pinhole layer has an array of pinhole apertures formed in a material substantially transparent to the light generated by the display layer and substantially opaque to the wavelength of light from the illuminator.

26 Claims, 4 Drawing Sheets

(58) Field of Classification Search
CPC .... G02B 27/0172; G02B 6/0043; G02B 5/20; G06F 1/1643; G06F 3/0421; G06K 9/0002; G06K 9/0004; G06T 1/0007; H01L 27/323
See application file for complete search history.

(56) References Cited

U.S. PATENT DOCUMENTS

| | | |
|---|---|---|
| 2004/0252867 A1 | 12/2004 | Lan et al. |
| 2008/0121442 A1 | 5/2008 | Boer et al. |
| 2010/0165267 A1* | 7/2010 | Yoshida .............. G02F 1/13318 349/106 |
| 2011/0122071 A1* | 5/2011 | Powell .................. G06F 3/0412 345/173 |
| 2013/0120760 A1* | 5/2013 | Raguin .................. G01B 11/24 356/612 |
| 2014/0098058 A1* | 4/2014 | Baharav ................ G06F 3/0421 345/174 |
| 2014/0355846 A1* | 12/2014 | Lee ...................... G06K 9/0004 382/124 |
| 2015/0347813 A1 | 12/2015 | Tsen |
| 2016/0132712 A1* | 5/2016 | Yang .................... G06K 9/0002 348/77 |
| 2016/0247010 A1 | 8/2016 | Huang et al. |

FOREIGN PATENT DOCUMENTS

| | | |
|---|---|---|
| CN | 104063704 A | 9/2014 |
| CN | 203838722 U | 9/2014 |
| CN | 104182727 A | 12/2014 |
| CN | 204028936 U | 12/2014 |
| WO | WO 15041459 | 3/2015 |
| WO | WO2016154378 A1 | 9/2016 |

OTHER PUBLICATIONS

Certified Priority Document for PCT/US2016/023891, U.S. Appl. No. 62/138,107, filed Mar. 25, 2015.

* cited by examiner

OPTICAL IMAGE SENSOR FOR DISPLAY INTEGRATION

FIELD OF THE DISCLOSURE

This disclosure generally relates to electronic sensor devices, and more particularly, to optical fingerprint sensors integrated into an active area of a display.

BACKGROUND OF THE DISCLOSURE

Biometric authentication systems are used for authenticating users of devices incorporating the authentication systems. Biometric sensing technology provides a reliable, non-intrusive way to verify individual identity for authentication purposes.

Fingerprints, like various other biometric characteristics, are based on unalterable personal characteristics and thus are a reliable mechanism to identify individuals. There are many potential applications for utilization of biometric and fingerprints sensors. For example, electronic fingerprint sensors may be used to provide access control in stationary applications, such as security checkpoints. Electronic fingerprint sensors may also be used to provide access control in portable applications, such as portable computers, personal data assistants (PDAs), cell phones, gaming devices, navigation devices, information appliances, data storage devices, and the like. Accordingly, some applications, in particularly portable applications, may require electronic fingerprint sensing systems that are compact, highly reliable, and inexpensive.

Additionally, in certain applications including an integrated display, a surface area on a front face of the device is a desirable location to provide a biometric sensor, such as a fingerprint sensor. However, locating the fingerprint sensor on the front face of the device can take up additional device real estate that could be used for the display. Alternatively, if the fingerprint sensor is integrated into the active area of the display using conventional techniques, this can interfere with the appearance of the display and distort the image displayed to the user. Furthermore, regardless of any distortion to the appearance of the display, using conventional sensing technologies, it is difficult to reliably sense fine fingerprint features through a thick glass layer or other cover layer that protects most displays.

BRIEF SUMMARY OF THE DISCLOSURE

One embodiment provides an electronic device including a display layer, a detector, a pinhole layer, a cover layer and an illuminator. The display layer is configured to generate light within a visible light spectrum. The detector is configured to be sensitive to a wavelength of light. The pinhole layer is located above both the display layer and the detector. The cover layer is located above the pinhole layer, and the illuminator is configured to illuminate a sensing region of the cover layer with the wavelength of light. Further, the pinhole layer has an array of pinhole apertures and a blocking portion between the pinhole apertures, wherein the blocking portion has an optical filter configured to pass the light from the display layer and block the light from the illuminator.

Another embodiment includes an optical sensor including a detector, a pinhole layer and an illuminator. The detector is configured to be sensitive to a wavelength of light. The pinhole layer is located above the detector, and the illuminator is configured to illuminate a sensing region located above the pinhole layer with the wavelength of light. Further, the pinhole layer has an array of pinhole apertures and a blocking portion between the pinhole apertures, wherein the blocking portion has an optical filter configured to pass a visible wavelength of light and block the light from the illuminator.

Yet another embodiment includes an electronic device including a display layer, an infrared detector, a pinhole layer, a cover layer and an infrared light source. The display layer is configured to generate light within a visible light spectrum. The pinhole layer is located above both the display layer and the infrared detector. The cover layer is located above the pinhole layer, and the infrared light source is configured to illuminate a sensing region of the cover layer with infrared light. Further, the pinhole layer has an array of pinhole apertures formed in an electrically conductive layer.

BRIEF DESCRIPTION OF THE DRAWING(S)

The accompanying drawings incorporated in and forming a part of the specification illustrate several aspects of the present disclosure and, together with the description, serve to explain the principles of the disclosure. In the drawings.

While the disclosure will be described in connection with certain preferred embodiments, there is no intent to limit it to those embodiments. On the contrary, the intent is to cover all alternatives, modifications and equivalents as included within the spirit and scope of the disclosure as defined by the appended claims.

DETAILED DESCRIPTION OF THE DISCLOSURE

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present disclosure provide input devices and methods that facilitate improved usability.

Figure 1:
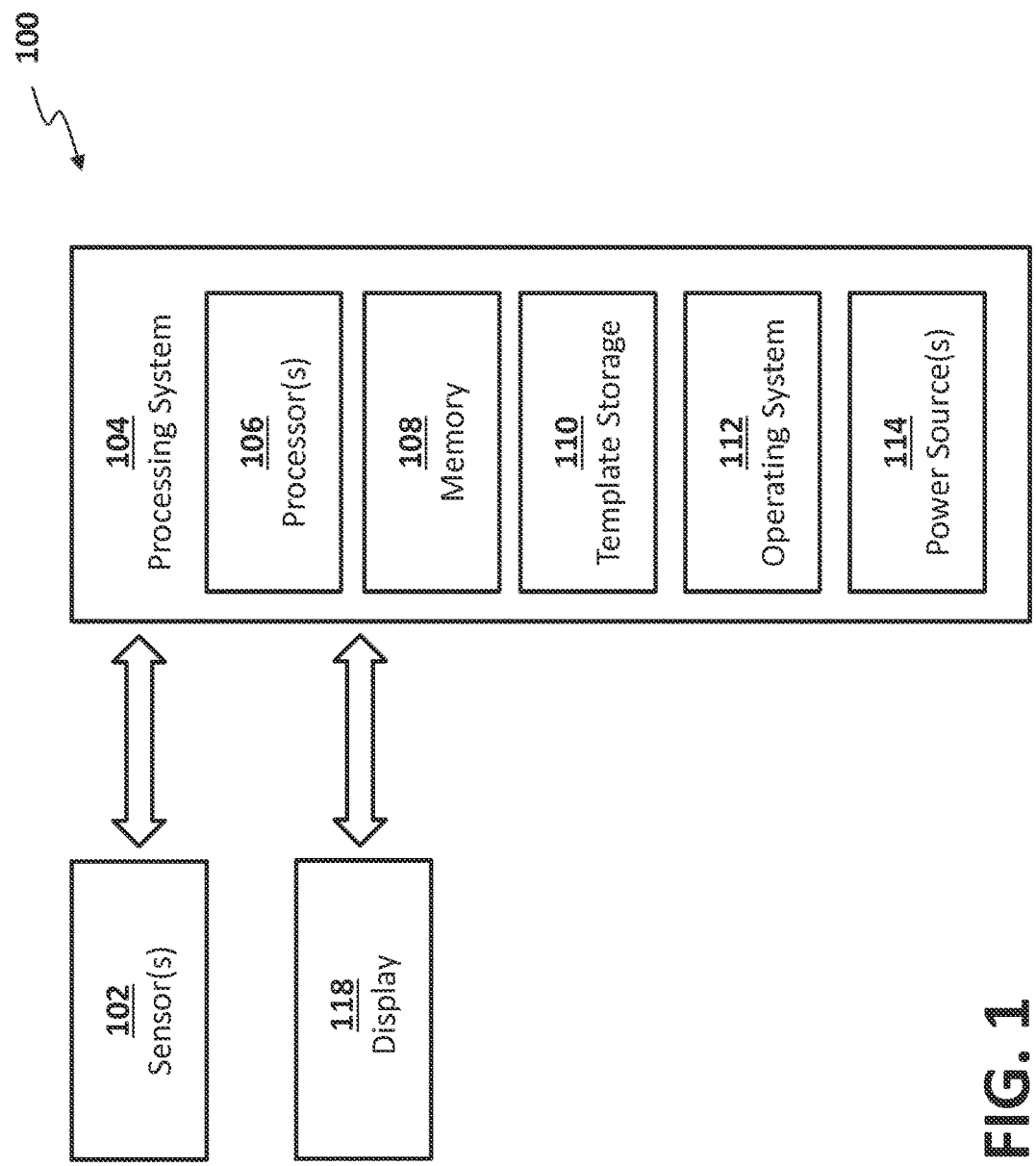
FIG. 1 is a block diagram of an exemplary system that includes an input device and a processing system, in accordance with an embodiment of the disclosure.

Turning now to the figures, FIG. 1 is a block diagram of an electronic system or device 100 that includes an input device such as sensor(s) 102 and processing system 104, in accordance with an embodiment of the disclosure. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic devices include composite input devices, such as physical keyboards and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic device 100 could be a host or a slave to the sensor(s) 102.

Sensor(s) 102 can be implemented as a physical part of the electronic device 100, or can be physically separate from the electronic device 100. As appropriate, the sensor(s) 102 may communicate with parts of the electronic device 100 using any one or more of the following: buses, networks, and other wired or wireless interconnections. Examples include $I^2C$, SPI, PS/2, Universal Serial Bus (USB), Bluetooth, RF, and IRDA.

In some embodiments, sensor(s) 102 will be utilized as a biometric sensor and more specifically as a fingerprint sensor utilizing one or more various electronic fingerprint sensing methods, techniques and devices to capture a fingerprint image of a user.

The sensor(s) 102 may include an optical sensor for optically capturing input data. The optical sensor provides illumination to a sensing region. Reflections from the sensing region at an illumination wavelength(s) are detected to determine input information corresponding to the input object, e.g., to capture fingerprint image data or other biometric image data.

By way of example, the optical sensor may utilize principles of direct illumination of the input object, which may or may not be in contact with an input surface of the sensing region depending on the configuration. One or more light sources and/or light guiding structures may be used to direct light to the sensing region. When an input object is input to the sensing region, this light is reflected from surfaces of the input object, which reflections can be detected by the optical sensing elements and used to determine information about the input object.

In another example, the optical sensor may utilize principles of internal reflection to detect input objects in contact with the input surface of the sensing region. One or more light sources may be used to direct light in a transmitting medium at an angle at which it is internally reflected at the input surface of the sensing region, due to different refractive indices at opposing sides of the boundary defined by the sensing surface. Contact of the input surface by the input object causes the refractive index to change across this boundary, which alters the internal reflection characteristics at the input surface. Higher contrast signals can often be achieved if principles of frustrated total internal reflection (FTIR) are used to detect the input object. In such embodiments, the light may be directed to the input surface at an angle of incidence at which it is totally internally reflected, except where the input object is in contact with the input surface and causes the light to partially transmit across this interface. In one embodiment, presence of a fingerprint is introduced to an input surface defined by a glass to air interface. The higher refractive index of human skin compared to air causes light incident at the input surface at a critical angle of the interface to air to be partially transmitted through to the fingerprint, where it would otherwise be totally internally reflected at the glass to air interface. This optical response can be detected by the system and used to determine spatial information. This may be used to image small scale fingerprint features, where the reflectivity of the incident light differs depending on whether a ridge or valley is in contact with that portion of the input surface. In certain embodiments, a capacitive sensor may be included in addition to the optical sensor. In these embodiments, the capacitive sensor may be utilized to provide touch position sensing and/or provide wakeup functionality for the electronic device 100.

The electronic device 100 may also include a display 118. In some embodiments, the sensor 102 is configured to detect input over at least part of an active area of the display. The display 118 may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The display 118 may also be flexible or rigid, and may be flat, curved, or have other geometries. By way of example, the display may include a glass or plastic substrate for TFT circuitry and/or other circuitry, which may be used to provide visuals and/or provide other functionality. The display device 118 may also include a cover layer disposed above display circuitry which may also provide an input surface for the sensor 102. The cover layer may include a cover lens (sometimes referred to as a "cover glass") with example cover lens materials include optically clear amorphous solids, such as chemically hardened glass, as well as optically clear crystalline structures, such as sapphire.

Turning now to the processing system 104 from FIG. 1, basic functional components of the electronic device 100 utilized during capturing and storing a user fingerprint image are illustrated. The processing system may be communicatively coupled to the sensor 102 and/or the display 118. The processing system 104 includes a processor(s) 106, a memory 108, a template storage 110, an operating system (OS) 112 and a power source(s) 114. Each of the processor(s) 106, the memory 108, the template storage 110, the operating system 112, and power source 114 are interconnected physically, communicatively, and/or operatively for inter-component communications.

As illustrated, processor(s) 106 is configured to implement functionality and/or process instructions for execution within electronic device 100 and the processing system 104. For example, processor 106 executes instructions stored in memory 108 or instructions stored on template storage 110. Memory 108, which may be a non-transient, computer-readable storage medium, is configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 also maintains program instructions for execution by the processor 106.

Template storage 110 comprises one or more non-transient computer-readable storage media. The template storage 110 is generally configured to store enrollment views for fingerprint images for a user's fingerprint. The template storage 110 may further be configured for long-term storage of information. In some examples, the template storage 110 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The processing system 104 also hosts an operating system 112. The operating system 112 controls operations of the components of the processing system 104. For example, the operating system 112 facilitates the interaction of the processor(s) 106, memory 108 and template storage 110.

The processing system 104 includes one or more power sources 114 to provide power to the electronic device 100. Non-limiting examples of power source 114 include single-use power sources, rechargeable power sources, and/or power sources developed from nickel-cadmium, lithium-ion, or other suitable material.

The electronic device 100 may also include one or more input devices in addition to the sensor 102. Input devices are configured to receive input from a user or a surrounding environment of the user through tactile, audio, and/or video feedback. Non-limiting examples of an input device include a presence-sensitive screen, a mouse, a keyboard, a voice responsive system, video camera, microphone or any other type of input device. In some examples, a presence-sensitive screen includes a touch-sensitive screen.

In certain embodiments, a touch-sensitive display may function as both an input device and an output device. For instance, the operating system 112 may configure the display to accept data from the user or the environment surrounding the user at one time, and at a different or the same time, configure the display to provide output data to the user.

Figure 2:
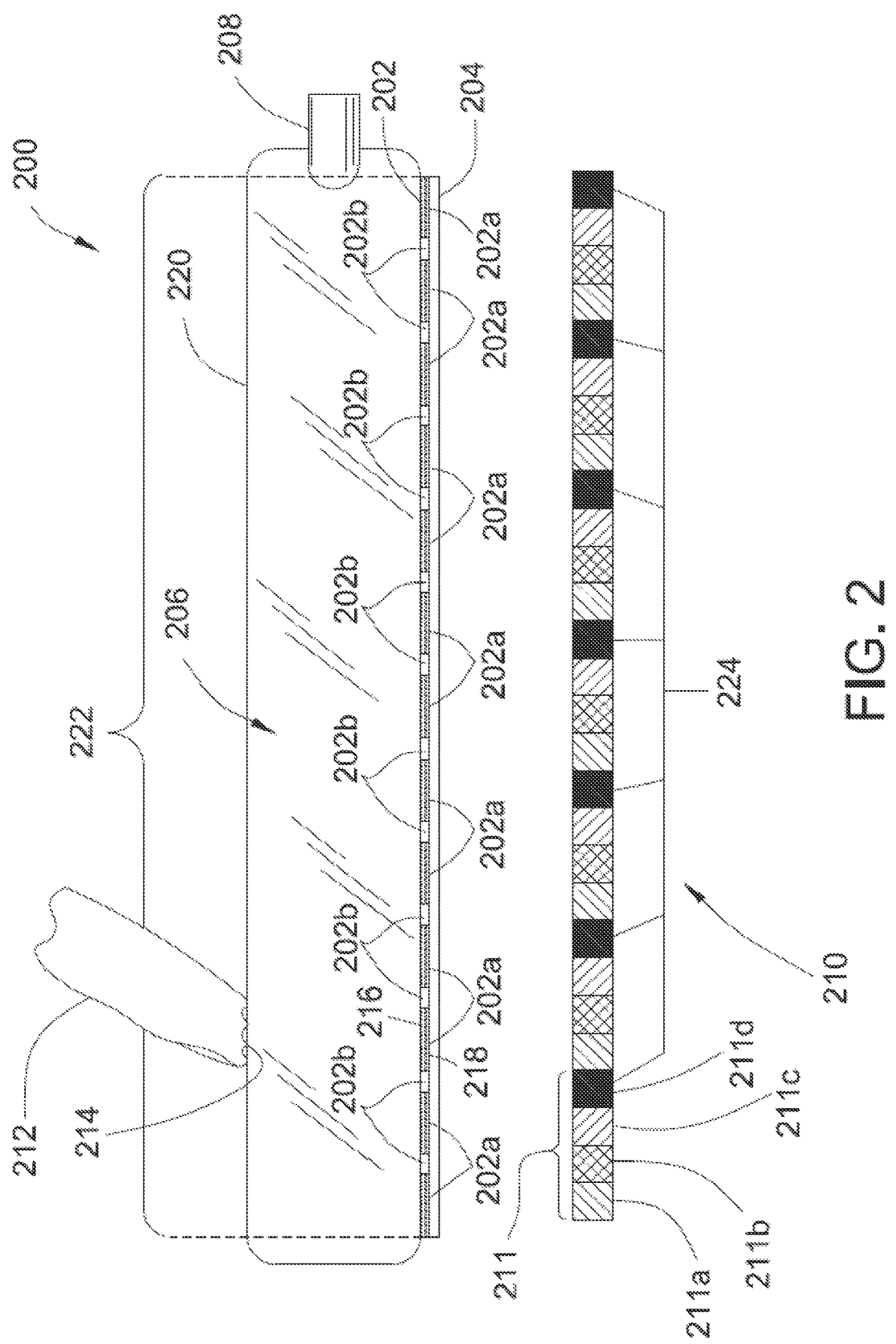
FIG. 2 is a schematic view of an optical biometric object reader, in accordance with an embodiment of the disclosure.

Turning now to FIG. 2, the sensor 102 (see FIG. 1) is configured as an optical sensor integrated into an electronic device 200 such as a cell phone with a touch sensitive display. The electronic device 200 includes a cover layer 206 disposed above a display layer 210. The display layer 210 is configured to provide a display for the electronic device 200. In embodiments where the display is a touch sensitive display, a touch sensitive layer 204 may be disposed above the display layer 210 and below the cover layer 206. Alternatively, all or a portion of the touch sensitive layer 204 may be integrated in the display layer, sometimes known as "in-cell" sensors. The touch sensitive layer 204 is configured to detect the position of a touch from an input object, such as a stylus or the finger 212.

The display layer 210 includes several pixels used to produce light in the visible spectrum for providing images to be displayed to a user of the electronic device 200. In some embodiments, the display layer 210 includes a pixel array including, for each pixel 211, a red sub-pixel 211a, a green sub-pixel 211b, a blue sub-pixel 211c which are formed on a display substrate (or display backplane). An array of photodetectors 211d may also be formed on the same substrate as the display pixels/sub-pixels used to produce visuals for the display in the visible spectrum. In certain embodiments, each pixel 211 of the pixel array includes a photodetector sub-pixel 211d. Alternatively, the photodetectors 211d may be disposed in only some subset of the display pixels, such as every fourth pixel, and/or disposed in an area between the display pixels/sub-pixels. The red sub-pixels 211a, green sub-pixels 211b and blue sub-pixels 211c (RGB pixels) are controlled by the processing system 104 (see FIG. 1) to produce light in the visible spectrum for the display. In embodiments including the photodetector pixels 211d in the display layer 210, the display layer 210 may be utilized by the processing system 104 to detect light incident on the display layer 210.

The electronic device 200 further includes an optical filter 202 for filtering light passing between the cover layer 206 and the display layer 210, a detector 224 for detecting certain wavelengths of light passing through the optical filter 202, and an illuminator 208 having a light source. The optical filter 202 includes an array of optical elements that condition the light reflected from the sensing region 222. In some embodiments, the optical filter 202 is a pinhole layer 202, or in other words, a pinhole filter 202 with an array of pinhole apertures 202b. The pinhole filter 202, detector 224, illuminator 208 and the cover layer 206 form the optical sensor. Generally, the pinhole filter 202 is disposed between the cover layer 206 and the display layer 210. In embodiments where the display is a touch sensitive display, the pinhole filter 202 may be disposed between the cover layer 206 and the touch sensitive layer 204. Alternatively, in other embodiments, the touch sensitive layer may be disposed above the pinhole filter 202 such that it is between the cover layer 206 and the pinhole layer 202.

In the illustrated embodiment, the detector 224 is provided by the photodetector pixels 211d in the pixel array of the display layer 210. In general, the detector 224 is configured to be sensitive to a wavelength of light produced by the illuminator 208 and have a pixel density great enough to image features of a user's fingerprint 214. In certain embodiments, the detector 224 may be separate from the display layer 210. For instance, in embodiments where the display layer 210 includes a color filter layer, an array of photodetectors may optionally be disposed above the color filter layer and be configured to function as the detector 224. Further, the detector 224 is communicatively coupled to the processing system 104 (see FIG. 1) so to be able to provide signals to the processing system 104.

In general, the optical sensor of the electronic device 200 has a magnification determined by a ratio of a distance between a top surface 220 of the cover layer 206 to the pinhole filter 202 and a distance from the pinhole filter 202 to the detector 224. In some embodiments, the distance between a top surface 220 of the cover layer 206 to the pinhole filter 202 ranges from about 0.2 to 0.8 millimeters, and the distance from the pinhole filter 202 to the detector 224 integrated into the sub-pixel region of the display layer 210 ranges from about 100 microns to 0.5 millimeters.

The pinhole filter 202 includes at least one pinhole aperture 202b through which light from the illuminator 208 that is incident on the pinhole filter 202 may pass. In the illustrated embodiment, the pinhole filter 202 has a planar structure including a plurality of pinholes 202b that form a two dimensional array. Each of the plurality of pinholes 202b extend from a first surface 216 of the pinhole filter 202 through to a second surface 218 of the pinhole filter 202. In certain embodiments, the plurality of pinholes 202b are patterned across the pinhole filter 202 every few millimeters and each pinhole 202b of the plurality of pinholes 202b is approximately 50 microns in diameter. The 50 micron diameter for the pinholes 202b is merely a representative diameter, and as such, the diameter may range from approximately 10 microns up to approximately 100 microns.

The pinhole filter 202 includes a blocking portion 202a between the pinhole apertures 202b that is configured to block light originating from the illuminator, but pass light from the display layer. The pinhole apertures, by contrast, pass light from the illuminator. This allows the apertures of the pinhole filter to condition light from the illuminator 208 that is reflected from the fingerprint 214, with minimal to no distortion of the appearance of the display to the user. The blocking portion includes an optical filter that passes the display light but blocks light of the type provided by the illuminator. By way of example, the blocking portion 202a may include a wavelength selective filter tuned to block light in the wavelengths of the illuminator, but pass the visible display wavelengths produced by the RGB pixels of the pixel array of the display layer 210, such as an edge pass filter configured to block infrared light above some near IR wavelength for an embodiment using invisible infrared illumination. Alternatively, the blocking portion 202a may include a polarizing filter configured to block light of a polarization provided by the illuminator 208.

Each pinhole aperture 202b of the pinhole filter 202 may condition light similar to a pinhole camera and project an inverted image of a portion of the sensing region 202 onto a set of multiple detector pixels 224 below. The set of detector pixels 224 for a given pinhole aperture 202b may contain a sub-image corresponding to a portion of the sensing region 202. Image data may be captured from multiple sets of detector pixels 224 with each set of detector pixels 224 capturing a respective sub-image of the sensing region 222 corresponding to a respective pinhole aperture 202b. In various embodiments, the processing system may combine the sub-image data from the multiple sets of detector pixels into composite image data in order to image a larger portion of the sensing region than can be imaged by any single pinhole aperture 202b, e.g., to image a larger portion of an input object 212 such as a fingerprint when it is input to the sensing region 222. Depending on the geometry of the sensor 200, such as the distances between the top surface 220 of the sensing region, the pinhole filter 202, and the detector pixel plane 224, as well as the refractive indices of the transmission mediums between these various components, the pinhole aperture may project sub-images onto overlapping or non-overlapping sets of detector pixels, i.e., some detector pixels may or may not be shared by multiple pinhole apertures depending on the sensor geometry. By way of example, compositing the image data may involve de-convolving image data from the detector pixels for sensor geometries where the pinholes apertures 202b project sub-images onto overlapping sets of detector pixels 224. As another example, compositing the image data may involve inverting the individual sub-images and stitching together the inverted sub-images into a larger composite image. The diameter of the pinholes 202b may also affect a resolution of the image data transmitted through the pinholes 202b and/or an intensity of the resulting image data signal.

In certain embodiments, the pinhole filter 202 has a surface area similar in size to the surface area of the display layer 210. The plurality of pinholes 202b may be uniformly dispersed across the surface area of the pinhole filter 202. Based on the size of the pinhole filter 202, a sensing region 222 may be determined. The sensing region 222 defines a region on a top surface 220 of the cover layer 206 where the processing system 104 (see FIG. 1) will be able to sense a biometric object 212 such as a fingerprint 214. In some embodiments, the sensing region 222 is defined to be large enough such that it can facilitate capturing an image of the entire fingerprint 214 is a single scan.

In the embodiment illustrated in FIG. 2, the sensing region 222 is shown as encompassing a surface area as large as the pinhole filter 202. However, in other embodiments, the sensing region 222 may encompass a surface area smaller than the surface area of the pinhole filter 202 and/or the top surface 220 of the cover layer 206.

In embodiments with a sensing region 222 smaller than an active area of the display layer 210 visible through the top surface 220 of the cover layer 206, the processing system 104 may cause the display layer 210 to indicate to the user the boundary of the sensing region 222 such that the user will know where to place the fingerprint 214. Moreover, in this embodiment, the pinhole filter 202 may be smaller so to accommodate the desired surface area of the sensing region. Additionally, the detector 224 may be sized to incorporate a same or similar size surface area to the pinhole filter 202.

The pinhole filter 202 may be formed from a variety of materials. In one embodiment, one such material is a multi-layer dielectric stack (MLD). The MLD stack is formed from alternating layers of material with alternating high and low dielectric constants in order to function as an optical filter that is substantially transparent to light generated by the display layer 210 and substantially opaque to light generated by the illuminator 208. Selecting specific dielectric constants and thicknesses of each layer of the MLD stack will allow the MLD stack to filter specific wavelengths of light from the illuminator but transmit visible light from the display.

Figure 3:
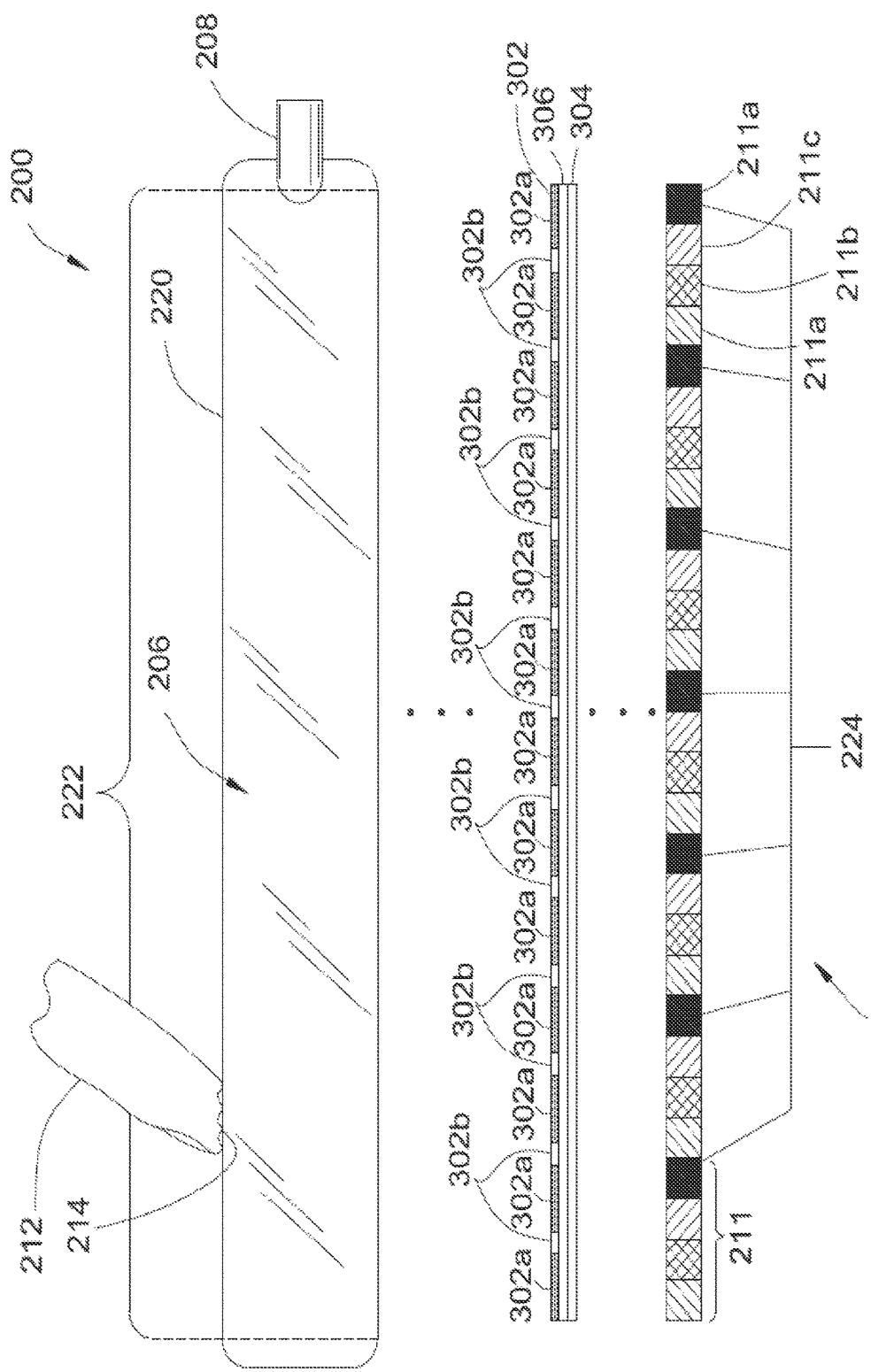
FIG. 3 is a schematic view of an optical biometric object reader, in accordance with an embodiment of the disclosure.

In another embodiment, as illustrated in FIG. 3, a pinhole filter 302 is formed from an electrically conductive layer that is transparent in the visible spectrum. By way of example, the electrically conductive layer can be made of indium tin oxide (ITO) or other transparent metal oxides, PEDOT, or another transparent conductive material. Electrically conductive layers, such as ITO, can be made to be transparent to visible wavelengths of light produced by the display, while acting as an optical filter that blocks infrared light above some set of wavelengths (e.g., an edge pass filter). In this embodiment, infrared light is provided by the illuminator. The conductive layer may be also disposed on an index matching (IM) layer 306 such that the material forming the pinhole filter 302 includes an index matching layer 306 with a patterned coating of conductive material. By way of example, the conductive layer 302 may be disposed on the top side of the IM layer 306, as illustrated in FIG. 3, or it may be disposed on the bottom side of the IM layer 306. The conductive material may be uniformly dispersed over the IM layer 306 and etched to form the pinhole filter 302 such that the plurality of pinholes 302b are formed through the conductive layer. The remaining portions of the conductive layer would then form the blocking portion 302a. The IM layer 306 functions to reduce the visibility of the pinhole pattern of the pinhole filter 302 from the user of the electronic device 200. As illustrated, the IM layer 306 is formed on a polyethylene terephthalate (PET) substrate layer 304, and each of the pinhole filter 302, the IM layer 306 and the PET substrate layer 304 are located in between the cover layer 206 and the display layer 210. Alternatively, other materials may be used for the substrate layer 304, such as other polymers or glass. In certain embodiments, the pinhole filter 302, the IM layer 306 and the PET substrate layer 304 are not in direct contact with the display layer 210. Further, in certain embodiments, the IM layer 306 and the PET layer 304 are substantially transparent to light produced by the display layer 210.

Additionally, in certain embodiments, the pinhole filter 302 formed from an electrically conductive material functions not just as an optical filter, but provides capacitive sensing. By way of example, this may be used to replace the touch sensitive layer 204 (see FIG. 2) so that the pinhole filter provides touch position sensing. As another example, this may be used to for presence detection to wake up the optical sensor for capturing image data when the input object, e.g., a fingerprint, is capacitively sensed in the sensing region. In this example, the touch sensor 204 may be used as a separate layer for touch position sensing.

Returning to FIG. 2, in another embodiment, another material that the pinhole filter 202 may be formed from is an absorbing dye. The absorbing dye may be deposited uniformly over a substrate such as the previously mentioned index matching layer, which would then form the pinhole filter 202. Once deposited, the absorbing dye may be etched such that the plurality of pinholes 202b may be formed through the dye and uniformly disposed across the surface area of the index matching layer. The absorbing dye used may have negligible absorption in the display layer emission wavelengths but strong absorption in the emission wavelengths of the illuminator.

In another embodiment, the pinhole filter is made of a polarizer such that the blocking portion of the pinhole filter includes a polarizing filter, while the pinhole aperture areas do not. The illuminator may provide polarized light to the sensing region, e.g., via a polarized light source or via a polarizer placed in front of the illuminator. The polarization extinction ratio at the illumination wavelength may be greater than a ratio of the blocking portion area to pinhole aperture area to provide suitable noise performance. The light from the display may be polarized or non-polarized depending on the display type.

Regarding the illuminator 208, in certain embodiments, it is configured within the electronic device 200 to introduce light into the cover layer 206 such that the light is totally internally reflected within the cover layer 206. Accordingly, the illuminator 208 is arranged such that it transmits light into the cover layer 206 at an angle greater than a particular critical angle with respect to a normal of the top surface 220 of the cover layer 206. In this manner, the illuminator 208 will uniformly illuminate the top surface 220 of the cover layer 206 such that when the user places the fingerprint 214 within the sensing region, light from the illuminator 208 incident where the user has placed the fingerprint 214 is reflected, by frustrated total internal reflection, from the fingerprint to the pinhole filter 202. In some embodiments, rather than direct light from the illuminator 208 directly into a cover glass of the cover layer 206, the cover layer 206 may include an additional light guide layer below the cover glass that is optically coupled to the cover glass.

As discussed above, the pinhole filter 202 includes the blocking portion 202a that is made from a material that is substantially opaque to the light produced by the illuminator 208. As such, the blocking portion 202a of the pinhole filter 202 does not pass the light reflected from the user's fingerprint 214. Rather, light from the illuminator 208 that is reflected by the user's fingerprint 214 will pass through at least one pinhole of the plurality of pinholes 202b such that the light reflected by the user's fingerprint 214 is incident upon the display layer 210 through the pinholes 202b.

In certain embodiments, the blocking portion 202a of the pinhole filter 202 may not have an angular reflectance for all light from the illuminator 208 incident upon the pinhole filter 202 up to the critical angle. In these embodiments, light from the illuminator 208 that was not reflected by frustrated total internal reflection from the fingerprint 214 in the sensing region may pass through to the detector 224 and blur the image of the fingerprint 214. In these embodiments, a mechanical barrier or optical structure could be added above the detector 224 such that light incident at an angle between the angular reflectance of the pinhole filter 202 and the critical angle will be blocked from the detector 224. In the illustrated embodiment, each pixel 211 of the display layer 210 includes a photodetector sub-pixel 211d. In some embodiments, the photodetector sub-pixels 211d of the pixel array of the display layer 210 have a pixel density, or in other words, a pixels per inch (PPI) equal to, greater than, or less than a PPI of the RGB pixels of the display layer 210. Accordingly, there may be more than one photodetector sub-pixel 211d for each single pixel 211, or there may be some pixels 211 that do not include any photodetector sub-pixel 211d according to some regular interval. The optical sensor pixel density (e.g., density of photodetector sub-pixels) may vary depending on the features of interest being imaged. In some embodiments, the optical sensor is implemented as a fingerprint sensor having a sensor resolution high enough to capture features of a fingerprint. For example, the fingerprint sensor may have a pixel density sufficient to capture minutia (including ridge endings and bifurcations), orientation fields (sometimes referred to as "ridge flows"), and/or ridge skeletons. These are sometimes referred to as level 1 and level 2 features, and in an exemplary embodiment, a pixel density of at least 250 pixels per inch is capable of reliably capturing these features. As another example, the fingerprint sensor may have a pixel density sufficient to capture higher level features, such as sweat pores or edge contours (i.e., shapes of the edges of individual ridges). These are sometimes referred to as level 3 features, and in an exemplary embodiment, a pixel density of at least 750 pixels per inch is capable of reliably capturing these higher level features.

Regardless of the pixel density of the photodetector sub-pixels 211d, each individual photodetector sub-pixel 211d is configured to be sensitive to the light from the illuminator 208 reflected by the user's fingerprint 214 that passes through the pinholes 202b of the pinhole filter 202. In this regard, the plurality of photodetector sub-pixels 211d of the pixel array of the display layer 210 function as the detector 224. Accordingly, each of the photodetector sub-pixels 211d provide a signal to the processing system 104 (see FIG. 1) when they detect the light from the illuminator 208 reflected by the user's fingerprint 214 that passes through the pinholes 202b of the pinhole filter 202. The processing system 104 then utilizes signals from each photodetector sub-pixel 211d that receives light reflected from the user's fingerprint in the sensing region 222 to composite an image of the user's fingerprint 214.

In some embodiments, the photodetector sub-pixels 211d forming the detector 224 may further include an interference filter configured to prevent any reflected visible light from the RGB pixels from interfering with light reflected by the fingerprint 214.

In certain embodiments, the light produced by the illuminator 208 is in the infrared spectrum, and in these embodiments, the detector 224 will be an infrared detector 224. However, in other embodiments, the illuminator 208 may be configured to produce soft ultra-violet light with a wavelength between 300 nm-400 nm. In general, the illuminator 208 may be configured to produce any wavelength of light different from the wavelength bands produced by the RGB pixels of the display layer 210, and the detector 224 will be configured to detect that wavelength of light. For instance, the illuminator 208, in certain embodiments, may produce light in the visible spectrum, as long as it is outside of the bandwidth of wavelengths of light produced by each of the RGB sub-pixels of the display layer 210. Or, in other embodiments, the illuminator 208 may produce a wavelength of light between light emission profiles for the red 211a or green 211b sub-pixels or green 211b and blue 211c sub-pixels. Additionally, in other embodiments, the illuminator 208 may produce light in an invisible spectrum.

In the illustrated embodiment, the illuminator 208 is configured as a light emitting diode (LED) disposed along a periphery of the cover layer 206. In this manner, the illuminator 208 generates light that is substantially totally internally reflected within the cover layer 206. In other embodiments, the illuminator 208 may include more than one light source, such as more than one LED disposed uniformly around the periphery of the cover layer 206. Each light source of the illuminator 208 would separately generate light that is substantially totally internally reflected within the cover layer 206.

In other embodiments, where the display layer 210 is made from an organic light emitting diode (OLED) technology, the illuminator 208 may include light emitting sub-pixels formed on the same substrate as the OLED display layer 210. By way of example, the light emitting sub-pixels may be disposed within a sub-pixel area of the display pixels, or the light emitting sub-pixels may be disposed in an area between the display pixels. In the embodiment where the illuminator 208 is integrated into the OLED display layer 210, the pinhole filter 202 may have a smaller surface area than the OLED display layer 210 such that the illuminator 208 (integrated into the OLED display layer 210) is able to direct the light produced by the illuminator 208 into the cover layer 206 such that the light is substantially totally internally reflected within the cover layer 206.

Figure 4:
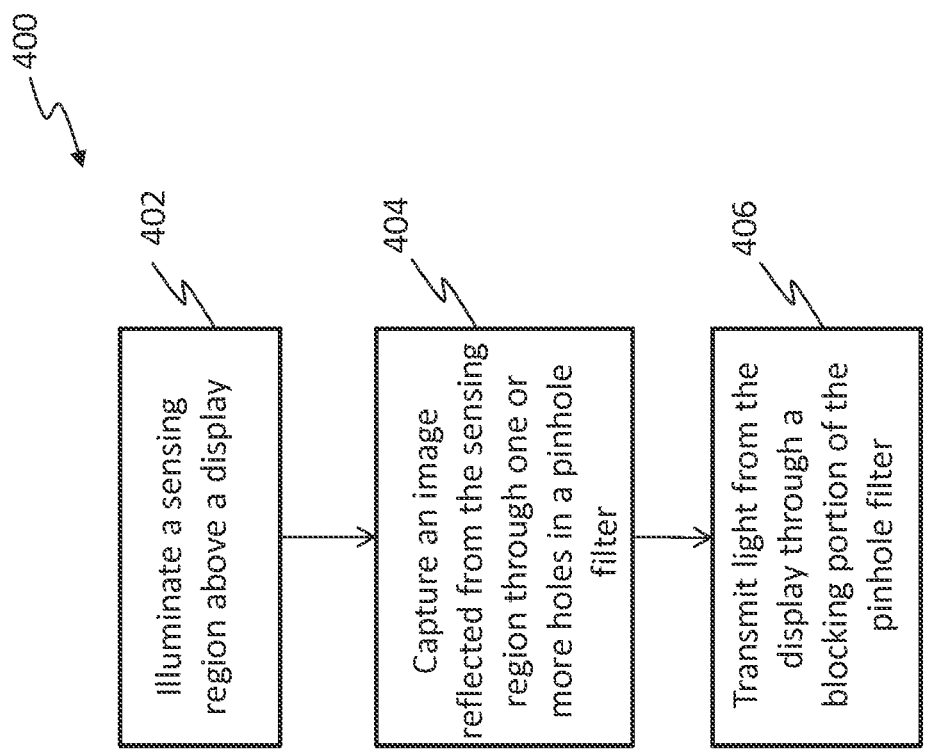
FIG. 4 is a flow diagram for a method of imaging a sensing region of an optical biometric object reader, in accordance with an embodiment of the disclosure.

FIG. 4 illustrates a method 400 of imaging a sensing region above a display of an electronic device 200 (see FIG. 2) such as a cell phone. The method 400 utilizes the processing system 104 (see FIG. 1) to control the optical sensor 102 as integrated into the electronic device 200 to image an input object such as the fingerprint 214 being placed in the sensing region 222 of a cover layer 206 of the electronic device 200. At block 402, the illuminator 208 is configured to illuminate the sensing region 222 with a wavelength of light different from a range of wavelengths of light produced by the display layer 210. This illumination of the sensing region occurs by directing light from the illuminator 208 into the cover layer 206 such that the light directed into the cover layer 206 is substantially internally reflected within the cover layer 206.

At block 404, the processing system 104 captures an image of the fingerprint 214 placed against the sensing region by receiving light reflected by the fingerprint 214 that passes through the pinholes 202b at the detector 224, which produces a signal that is provided to the processing system 104 for use in capturing the image of the fingerprint 214. And, at block 406, the display layer 210 generates light that is transmitted through the blocking portion 202a of the pinhole filter 202 such that the user is able to view the images generated by the display layer 210.

Figure 5:
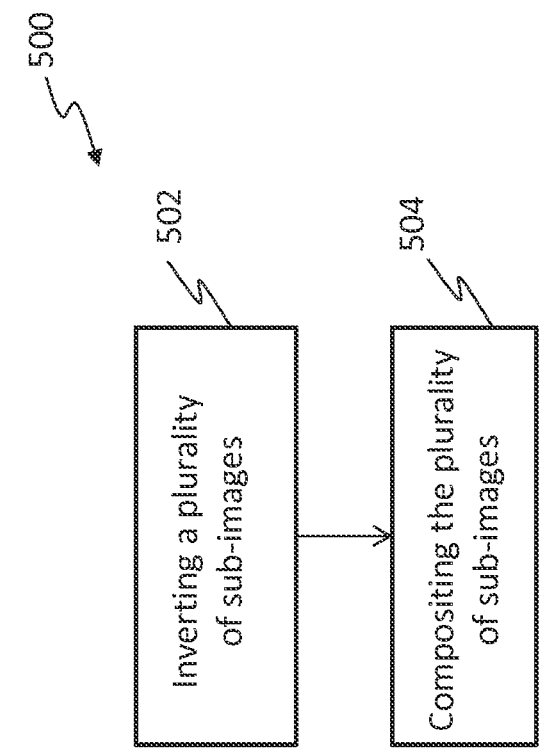
FIG. 5 is a flow diagram for capturing an image reflected from a sensing region of an optical biometric object reader, in accordance with an embodiment of the disclosure.

FIG. 5 illustrates a method 500 including steps for capturing an image (as performed at block 404 (see FIG. 4) of method 400) of the user's fingerprint 214 (see FIG. 2). At block 502, the detector 224 receives a plurality of sub-images from the light from the illuminator 208 reflected from the user's fingerprint 214 placed in the sensing region 222 and reflected through the pinholes 202b and provides signals related to the plurality of sub-images to the processing system 104 (see FIG. 1), which in turn inverts those sub-images. At block 504, the processing system 104 (see FIG. 1) composites the plurality of sub-images to form an image of the user's fingerprint 214.

The embodiments and examples set forth herein were presented in order to best explain the present disclosure and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An electronic device comprising:
   a display layer configured to generate light within a visible light spectrum;
   a detector configured to be sensitive to a wavelength of light;
   a pinhole layer above both the display layer and the detector;
   a cover layer above the pinhole layer; and
   an illuminator configured to illuminate a sensing region of the cover layer with the wavelength of light,
   wherein the illuminator is disposed above the display layer, the detector and the pinhole layer, wherein the pinhole layer includes a blocking portion and an array of pinhole apertures formed through the blocking portion, and wherein the blocking portion has an optical filter configured to pass the light from the display layer and block the light from the illuminator such that light from the display layer passes through the blocking portion of the pinhole layer to the cover layer.

2. The electronic device of claim 1, wherein the optical filter of the blocking portion includes a wavelength selective filter configured to block the wavelength of light from the illuminator and pass the light within the visible spectrum from the display layer.

3. The electronic device of claim 2, wherein the optical filter of the blocking portion includes a multi-layer dielectric (MLD) stack film.

4. The electronic device of claim 2, wherein the optical filter of the blocking portion includes an absorbing dye configured to absorb the wavelength of light from the illuminator.

5. The electronic device of claim 1, wherein the optical filter of the blocking portion includes an electrically conductive layer.

6. The electronic device of claim 5, wherein the electrically conductive layer includes indium tin oxide (ITO).

7. The electronic device of claim 5, wherein the electrically conductive layer includes a metal oxide.

8. The electronic device of claim 5, wherein the electrically conductive layer is disposed on an index matching layer.

9. The electronic device of claim 1, wherein the illuminator is configured to illuminate the sensing region with polarized light, wherein the optical filter of the blocking portion includes a polarizing filter configured to block the polarized light.

10. The electronic device of claim 1, wherein the wavelength of light from the illuminator is within an invisible spectrum of light.

11. The electronic device of claim 1, wherein the wavelength of light from the illuminator is within an infrared light spectrum.

12. The electronic device of claim 1, wherein the display layer includes sub-pixels that produce light emission profiles and the wavelength of light from the illuminator is between the emission profiles from the sub-pixels of the display layer.

13. The electronic device of claim 1,
wherein the illuminator is configured to direct the wavelength of light into the cover layer at an angle in which the wavelength of light is totally internally reflected at an upper surface of the cover layer; and
wherein the sensing region is illuminated through frustrated total internal reflection of an input object in contact with the upper surface of the cover layer.

14. The electronic device of claim 1, wherein the display layer includes pixels formed on a display substrate that produce the light within the visible spectrum, wherein the detector includes an array of photodetectors formed on the display substrate.

15. The electronic device of claim 1, wherein the detector comprises an array of photodetectors formed on the display layer.

16. The electronic device of claim 1, wherein the pinhole layer and the detector span at least a portion of an active area of the display layer.

17. The electronic device of claim 1, wherein the detector comprises an array of photodetectors having a resolution configured to image a fingerprint pattern.

18. An optical sensor comprising:
a detector configured to be sensitive to a wavelength of light;
a pinhole layer above the detector; and
an illuminator configured to illuminate a sensing region located above the pinhole layer with the wavelength of light,
wherein the illuminator is disposed above the detector and the pinhole layer,
wherein the pinhole layer includes a blocking portion and an array of pinhole apertures formed through the blocking portion,
wherein the blocking portion has an optical filter configured to pass a visible wavelength of light and block the light from the illuminator such that the visible wavelength of light passes through the blocking portion of the pinhole layer.

19. The optical sensor of claim 18, wherein the optical filter of the blocking portion includes a wavelength selective filter configured to block the wavelength of light from the illuminator and pass the visible wavelength of light.

20. The optical sensor of claim 18, wherein the illuminator is configured to illuminate the sensing region with polarized light, wherein the optical filter of the blocking portion includes a polarizing filter configured to block the polarized light.

21. The optical sensor of claim 18, wherein the biometric pattern is a fingerprint pattern.

22. An electronic device comprising:
a display layer configured to generate light within a visible light spectrum;
an infrared detector;
a pinhole layer above both the display layer and the infrared detector;
a cover layer above the pinhole layer; and
an infrared light source configured to illuminate a sensing region of the cover layer with infrared light,
wherein the infrared light source is disposed above the display layer, the infrared detector and the pinhole layer,
wherein the pinhole layer is an electrically conductive layer including a blocking portion and an array of pinhole apertures formed through the blocking portion,
wherein the blocking portion has an optical filter configured to pass the light from the display layer and block the infrared light from the infrared light source such that light from the display layer passes through the blocking portion of the pinhole layer to the cover layer.

23. The electronic device of claim 22, further comprising a processing system comprising a processor configured to operate the electrically conductive layer as a capacitive sensor.

24. The electronic device of claim 1, wherein all of the light from the illuminator is blocked from passing through the pinhole layer to the detector except that portion of the light from the illuminator that passes through one or more pinhole apertures of the array of pinhole apertures.

25. The optical sensor of claim 18, wherein all of the light from the illuminator is blocked from passing through the pinhole layer to the detector except that portion of the light from the illuminator that passes through one or more pinhole apertures of the array of pinhole apertures.

26. The electronic device of claim 22, wherein all of the light from the infrared light source is blocked from passing through the pinhole layer to the infrared detector except that portion of the light from the infrared light source that passes through one or more pinhole apertures of the array of pinhole apertures.

* * * * *